(12) United States Patent
Murray

(10) Patent No.: US 9,342,315 B2
(45) Date of Patent: May 17, 2016

(54) UNIVERSAL MICROCODE IMAGE

(71) Applicant: Scientific-Atlanta, LLC, Lawrenceville, GA (US)

(72) Inventor: Mark Murray, Atlanta, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/044,903

(22) Filed: Oct. 3, 2013

(65) Prior Publication Data

US 2014/0040607 A1 Feb. 6, 2014

Related U.S. Application Data

(62) Division of application No. 11/742,045, filed on Apr. 30, 2007, now Pat. No. 8,578,332.

(51) Int. Cl.
*G06F 9/24* (2006.01)
*G06F 9/44* (2006.01)
*G06F 9/445* (2006.01)

(52) U.S. Cl.
CPC ............... *G06F 9/4401* (2013.01); *G06F 8/60* (2013.01); *G06F 9/445* (2013.01)

(58) Field of Classification Search
CPC ......... G06F 8/60; G06F 9/445; G06F 9/4401; G06F 9/4411; G06F 9/44505; H04L 67/125
USPC .......... 713/1, 2, 100; 717/120, 121, 168, 177
See application file for complete search history.

(56) References Cited

U.S. PATENT DOCUMENTS

| | | | |
|---|---|---|---|
| 5,600,823 A | 2/1997 | Sherer et al. | |
| 5,835,773 A | 11/1998 | Dunn | |
| 5,857,106 A | 1/1999 | Barbour et al. | |
| 5,974,254 A | 10/1999 | Hsu | |
| 6,401,201 B2 | 6/2002 | Fish et al. | |
| 7,003,534 B2 * | 2/2006 | Peng | 707/758 |
| 7,146,609 B2 | 12/2006 | Thurston et al. | |
| 7,178,141 B2 | 2/2007 | Piazza | |
| 7,415,603 B2 * | 8/2008 | Woundy et al. | 713/1 |

(Continued)

FOREIGN PATENT DOCUMENTS

| | | |
|---|---|---|
| GB | 2408821 B | 4/2006 |
| WO | WO 2006/111209 A | 10/2006 |

OTHER PUBLICATIONS

B. De Sutter et al., "Link-time binary rewriting techniques for program compaction," ACM Transactions on Programming Languages & Systems, vol. 27, No. 5, Sep. 2005, pp. 882-945.

(Continued)

*Primary Examiner* — Mark Connolly
(74) *Attorney, Agent, or Firm* — Merchant & Gould P.C.

(57) ABSTRACT

Systems and methods for creating universal microcode images and for reconstructing a microcode image from a universal microcode image are described in the present disclosure. One method, among others, comprises receiving a plurality of microcode images each configured to initialize hardware within an electronic device before the electronic device is booted up. The method also includes separating each microcode image into sections and comparing the sections to determine whether or not two or more sections contain identical code. The method also includes creating a universal microcode image from the sections that are unique.

19 Claims, 4 Drawing Sheets

(56) References Cited

U.S. PATENT DOCUMENTS

| | | |
|---|---|---|
| 7,444,621 B2 | 10/2008 | Pletcher et al. |
| 7,509,635 B2 * | 3/2009 | Woodhouse .................. 717/168 |
| 7,590,835 B1 | 9/2009 | Nallagatla et al. |
| 7,739,359 B1 * | 6/2010 | Millet et al. .................. 709/220 |
| 7,839,870 B2 * | 11/2010 | Siripunkaw et al. .......... 370/401 |
| 8,578,332 B2 | 11/2013 | Murray |
| 2004/0034849 A1 | 2/2004 | Cohen et al. |
| 2004/0049669 A1 | 3/2004 | Schelling et al. |
| 2004/0107416 A1 | 6/2004 | Buban et al. |
| 2004/0139099 A1 | 7/2004 | Weaver |
| 2004/0221270 A1 | 11/2004 | Witchel et al. |
| 2005/0243640 A1 | 11/2005 | Rudelic et al. |
| 2006/0031815 A1 | 2/2006 | Bhagia et al. |
| 2006/0039618 A1 | 2/2006 | Ogle |
| 2006/0242631 A1 | 10/2006 | Andersen et al. |
| 2007/0050762 A1 | 3/2007 | Chen et al. |
| 2008/0270778 A1 | 10/2008 | Murray |

OTHER PUBLICATIONS

PCT International Search Report for PCT/US2008/061716 dated Aug. 25, 2008.
European Communication dated Jun. 24, 2010 cited in Application No. 08 746 995.3—1243.
Canadian Office Action dated Aug. 1, 2011 cited in Application No. 2,685,694.
Canadian Office Action dated Oct. 12, 2011 cited in Application No. 2,685,694, 3 pgs.
Canadian Office Action dated Jul. 28, 2014 cited in Application No. 2,685,694, 4 pgs.
Canadian Office Action dated Sep. 28, 2015 cited in Application No. 2,685,694, 7 pgs.

* cited by examiner

UNIVERSAL MICROCODE IMAGE

RELATED APPLICATIONS

This application is a Division of co-pending U.S. application Ser. No. 11/742,045 entitled "Universal Microcode Image" filed Apr. 30, 2007, which is incorporated herein by reference.

TECHNICAL FIELD

The present disclosure generally relates to microcode images used for initializing hardware and set-up parameters before operation of an electronic device. More particularly, the present disclosure relates to systems and methods for creating a single universal microcode image from a number of microcode images.

BACKGROUND

Microcode images are used in the field of processor-based systems for setting initial hardware configurations in an electronic device when the electronic device is first powered up or booted up. Microcode images are also used to load an operating system into the electronic device. In addition, microcode images can also perform diagnostic tests of the hardware during this initialization stage.

As an example, a set-top box, which is used to provide television signals to a television set, can include a networking chip that uses, for instance, a 128 kilobyte microcode image during a reboot procedure. It should be noted, however, that one set-top box may use a microcode image that is different from a microcode image of another set-top box depending on certain "device configuration parameters." For instance, these device configuration parameters may include, for example, media type, frequency band, and quality of service (QoS). Parameters related to media type correspond to different types of media to which the set-top box is connected, e.g. twisted pair wiring or coaxial cable. Parameters related to frequency band correspond to different frequency ranges within which the set-top box operates, e.g. a 12-20 MHz band, 18-25 MHz band, or other frequency bands that may be introduced in the future. Parameters related to QoS correspond to different network performance or service expectations from various providers.

In this example, given that there are three device configuration parameters and each includes two selectable variables, the number of permutations or different combinations of device configuration parameters is eight. A set-top box uses one of these eight permutations upon reboot, and the appropriate permutation is loaded into that set-top box. Other set-top boxes having different device configuration parameters require a different microcode image. To manage the different microcode images for each set-top box, a network operator can store the various permutations for each set-top box in the network. However, managing which set-top box maps to which combination of selectable parameters can be overwhelming to a network operator when hundreds or even thousands of set-top boxes and parameter combinations are possible. Also, this solution would require a large amount of storage and management resources and is not particularly feasible.

Another solution to the issue of multiple permutations of microcode images is to store all possible permutations on each set-top box. Then, based on the particular set-up configuration of each device, the respective permutation can be used as needed. However, since each microcode image may be about 128 Kbytes, storing eight images would require more than 1 Mbyte of flash memory. As more device configuration parameters and/or selectable variables are introduced, even more memory would be needed to store the numerous permutations. Dedicated flash memory for storing these permutations in this environment therefore adds a significant cost to a set-top box. Substantial savings could therefore be achieved by reducing the amount of storage needed during start up. Thus, a need exists in the industry to address the aforementioned deficiencies and inadequacies to simplify the management of various microcode images for different device configurations and to reduce the cost of these devices.

BRIEF DESCRIPTION OF THE DRAWINGS

Many aspects of the embodiments disclosed herein can be better understood with reference to the following drawings. Like reference numerals designate corresponding parts throughout the several views.

DETAILED DESCRIPTION

Figure 1:
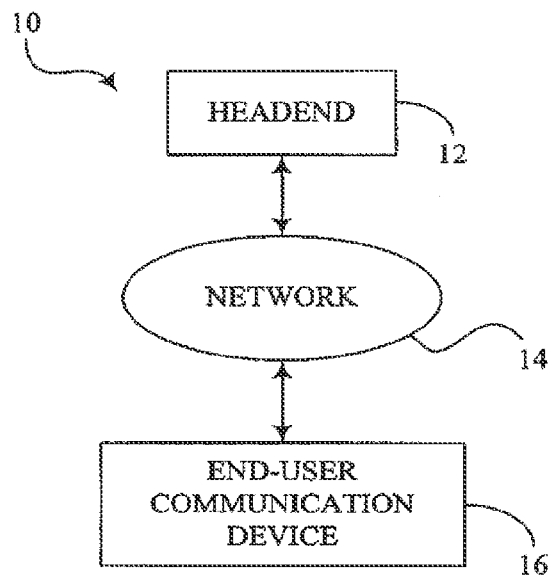
FIG. 1 illustrates, in general, a block diagram of an embodiment of a communication system.

Electronic devices, such as set-top boxes, often use a "microcode image" to initialize hardware and configuration parameters during start up or reboot. In this disclosure, a microcode image contains, for example, instructions, such as executable software code, and data, such as configuration information. The term "microcode image" used throughout this disclosure can also apply to basic input/output system (BIOS) code or other firmware code used during power up and/or boot up of a processor-based system. To store this microcode image, each electronic device typically includes a dedicated memory device.

These electronic devices may include certain built-in design features, such a frequency range in which the device operates, and may be configured or set-up in a particular arrangement. For example, an Internet protocol (IP) set-top box (STB) may operate within a 12-20 MHz or 18-25 MHz range or within a range of frequencies that may become available in the future. Also, these devices may be connected to a network using twisted pair wiring or coaxial cable, depending on the medium being used. These devices may also include any number of other configuration parameters, customer parameters, compatibility parameters, quality of service (QoS) parameters, etc. Based on these device configuration parameters and variables, each electronic device typically uses a version of microcode that allows the electronic device to properly boot up. Since a number of permutations for different variables can be realized, it may be necessary to store the various permutations to be selected as needed.

In one example, an IP STB having a home-networking interface chip, such as a CopperGate™ home-networking chip, typically uses a 128 Kbyte microcode image. Given that eight permutations of microcode images are available, for example, more than one megabyte of storage would be needed to store eight images. With the introduction of additional media types, frequency bands, or other configuration parameters, the number of permutations becomes even greater. Since the cost of one Mbytes of flash memory is not inexpensive, eliminating the need for this dedicated storage could greatly reduce the overall cost of manufacturing these devices. According to the present disclosure, the amount of memory used to store these various permutations is reduced.

In some scenarios, multiple sections of each image are identical. The stored microcode images can therefore be reduced in size by comparing the sections of the microcode images to determine the sections that are the same and keeping only one copy of the identical sections. For another section that is the same as a previous section, the second copy of the same code is not needed in storage and can be deleted. Since one copy is already stored, an index can be made to that copy to reuse it when the identical code is needed.

As a result, the multiple microcode images can be joined together into a single universal microcode image having a corresponding index table to allow proper reconstruction of the original microcode images. With the creation of a universal image that can be applied to each consumer device, managing the distribution of microcode to these numerous consumer devices throughout the network is greatly simplified. Also, by eliminating redundant sections of code, the universal image can be created to have a size that is about the same size as one non-redundant microcode image, e.g. 128 Kbytes.

The present disclosure describes systems and methods for creating a universal microcode image from a plurality of microcode images and for reconstructing an original microcode image for an individual electronic device. One embodiment among others is described, for example, as a microcode image managing system. This system comprises memory configured to store a plurality of microcode images, wherein each microcode image comprises executable code and configuration information for initializing an electronic device before operation of the electronic device. The system also includes a packing program, which is stored in the memory, that is executed by a processor to create a universal microcode image from the plurality of microcode images and to create an index table. The packing program comprises logic configured to perform a binary comparison of sections of each of the plurality of microcode images to create the universal microcode image including a combination of unique sections. The index table is configured to match which unique sections are contained in each of the plurality of microcode images.

In addition, the present disclosure describes a method comprising the steps of receiving a plurality of microcode images each configured to initialize hardware within an electronic device before the electronic device is booted up. The method also includes separating each microcode image into sections and comparing the sections to determine whether or not two or more sections contain identical code. The method also includes the step of creating a universal microcode image from the sections that are unique.

Another embodiment described herein includes an end-user communication device that comprises memory and a processor. The memory is configured to store a universal microcode image, an index table, and a configuration loading program. The processor is configured to execute the configuration loading program. The universal microcode image comprises executable code sections and configuration information sections. The index table comprises code entries that associate each of a number of possible permutations of device configuration parameters with a combination of executable code sections and configuration information sections of the universal microcode image. The processor is further configured to load the combination of executable code sections and configuration information sections into a boot program for booting up the end-user communication device.

Another embodiment of a method described herein comprises the steps of receiving a universal microcode image created from sections of a plurality of microcode images. The method also comprises the steps of determining configuration parameters of an electronic device and matching the configuration parameters with an entry in an index table, wherein the entry is associated with a combination of sections of the universal microcode image. The method also includes assembling the combination of sections of the universal image to reconstruct a microcode image having executable code and configuration information designed to initialize the electronic device.

FIG. 1 is a block diagram of an embodiment of a communication system 10. In this implementation, the communication system 10 generally includes a headend 12, network 14, and an end-user communication device 16. It should be recognized that the communication system 10 may include any number of end-user communication devices 16 connected to the network 14. However, to simplify the drawing, only one end-user communication device 16 is shown in FIG. 1. The communication system 10 is capable of transmitting signals in a wired and/or wireless manner between the headend 12 and the end-user communication device 16 via the network 14. The network 14 may include a television network, data network, such as the Internet, a public switched telephone network (PSTN), and/or a cable network, etc. The network 14 includes any suitable combination of hubs, nodes, switches, relays, etc. The network 14 may support transmission of electrical signals, optical signals, wireless signals, or other forms of signals throughout the communication system 10. The signal may include television signals, such as video information and audio information, telephone signals, data signals, etc.

The headend 12 may be a facility operated by a network operator, a service provider, a central office, or may be any suitable facility for managing the communication system 10 or network 14. In addition to the conventional operations of the headend 12, the headend 12 is also configured to create a "universal microcode image" that can be used by end-user communication devices 16. The headend 12 receives specific microcode images from manufacturers corresponding to various combinations or permutations of device configuration parameters for each of the end-user communication devices 16. In this respect, a universal image can be created that is compatible with a heterogeneous population of devices.

In some scenarios, about 80-90% of a typical 128-Kbyte image is the same from one version to the next. By performing a binary comparison of the different microcode images, the headend 12 is able to bundle the multiple versions of the images together into a single universal microcode image. The headend 12 can also create a corresponding index table that points to sections of the universal image allowing the original microcode image to be reconstructed when needed at boot time. The headend 12 can broadcast the universal image periodically to the end-user communication devices 16 or can make the universal image available for download when needed. When additional permutations of the variables become available or at other times when the microcode is changed, the headend 12 can update the universal microcode image.

The end-user communication device 16 in these embodiments can be any suitable device that stores a microcode image or other similar initialization or set-up code that is used when the device is booting up. For example, the end-user communication device 16 may be a set-top box, an IP STB, a modem, a computer, a home networking device, a television with two-way communication capabilities, or other similar device. When a boot up procedure is to be performed, the universal image is retrieved from memory along with the particular device configuration parameters of the end-user communication device 16. The device configuration parameters include, for example, media type, frequency band, quality of service (QoS), and/or other configuration or compatibility variables. The end-user communication device 16 is able to reconstruct an operable microcode image from the universal image and device configuration parameters using an index table that maps the sections of the universal image to the particular device configuration parameters of that device. With the appropriate microcode image reconstructed, the end-user communication device 16 is able to boot up properly. In other embodiments, the microcode image can also be used to power up the device or set configuration or set-up parameters as needed.

Figure 2:
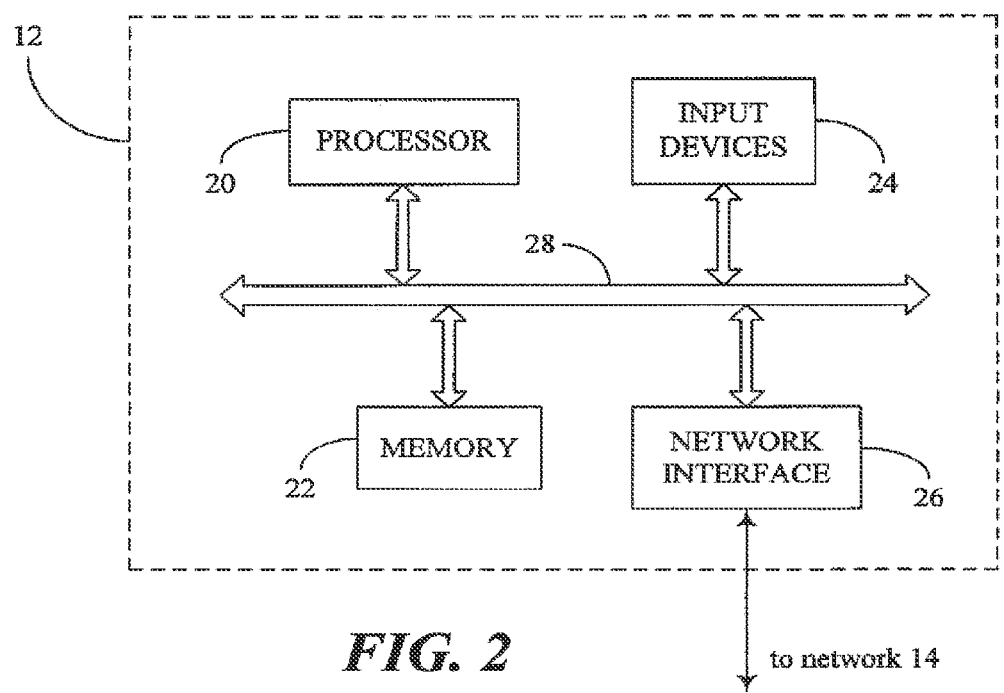
FIG. 2 is a block diagram of an embodiment of the headend shown in FIG.

FIG. 2 is a block diagram of an embodiment of the headend 12 shown in FIG. 1. In this embodiment, the headend 12 includes, among other things, a processor 20, memory 22, input devices 24, and network interface 26, each interconnected by an interface bus 28. In some embodiments, the processor 20, memory 22, and input devices 24 are located remote from the headend 12 and can communicate with headend 12 when the universal microcode image is ready to be distributed to the end-user communication devices 16. The input devices 24 may include any suitable means for receiving data or information and can receive microcode images from manufacturers for each particular permutation of device configuration parameters. Also, the input devices 24 can receive updates of images when available.

The memory 22 stores the images and updates of the permutations. The memory 22 also stores a packing program, which the processor 20 runs to combine the multiple permutations and create a universal image. This universal image can also be stored in memory 22. Thereafter, the processor 20 instructs the network interface 26 to distribute the universal image to the end-user communication devices 16 via the network 14. The distribution of the universal image may include a broadcast of the image at periodic intervals, a unicast to specific end-user communication devices 16, and/or can include or be associated with a downloading device for allowing the end-user communication devices 16 to download the universal image when needed.

Figure 3:
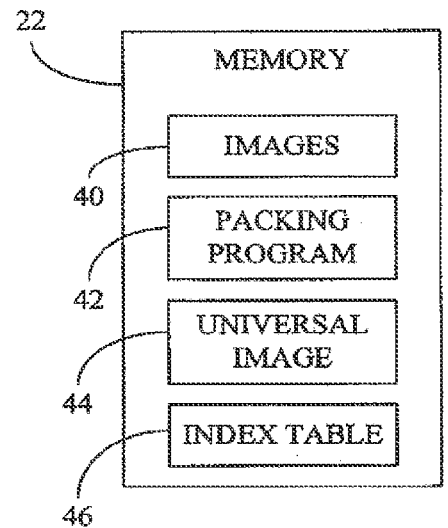
FIG. 3 is a block diagram of an embodiment of the memory shown in FIG. 2.

FIG. 3 is a block diagram of an embodiment of the memory 22 shown in FIG. 2. The memory 22 may include any suitable combination of non-volatile memory and volatile memory. The non-volatile memory may include, for example, flash memory, read-only memory (ROM), programmable ROM (PROM), electrically erasable PROM (EEPROM), etc. The volatile memory may include, for example, random access memory (RAM), dynamic RAM (DRAM), etc. In the embodiment as shown in FIG. 3, the memory 22 stores code sets including microcode images 40, a packing program 42, a universal image 44, and an index table 46. The correlation among these sets of code stored in memory 22 is discussed with respect to FIG. 4.

Figure 4:
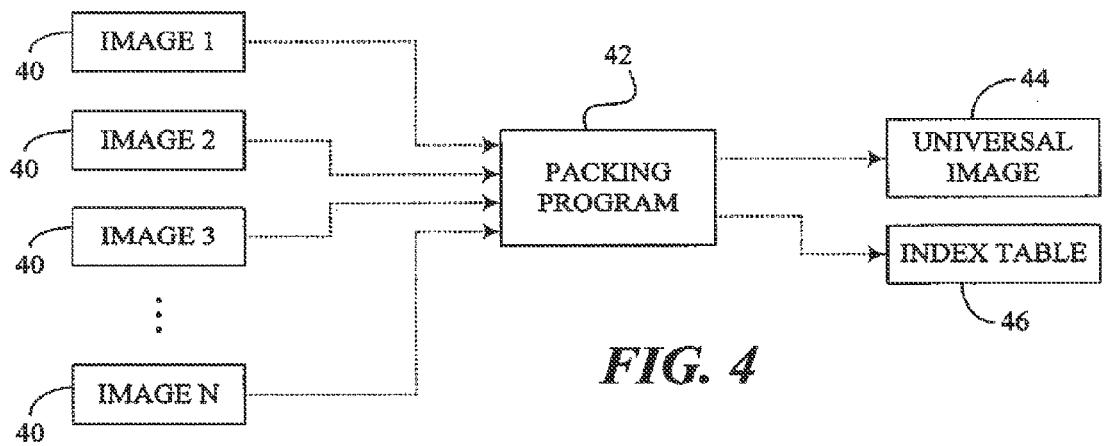
FIG. 4 is a schematic diagram illustrating an embodiment of a process for creating a universal image.

FIG. 4 is a diagram illustrating an embodiment of the relationship between the sets of code stored in memory 22 described in FIG. 3. Possible permutations of multiple microcode images (IMAGE 1, IMAGE 2, . . . , IMAGE N) 40, such as those supplied by manufacturers, are provided to the packing program 42. The variable "N" represents a number of total permutations depending on the number of device configuration parameters and selectable variables. The images 40 represent the original microcode images each created for a specific combination of device configuration parameters. In some embodiments, the number of permutations may be as high as 256.

The packing program 42 receives the various images and finds "section markers", which may be placed in the image, for example, by the manufacturers. The section markers identify the boundaries in the code that separate one section from another. The different types of sections of microcode may include, for example, one or more "code" sections, one or more "configuration" sections, one or more "profile" sections, and one or more "data" sections. Each section can also be defined according to its length. The packing program 42 searches through the sections of the different images to identify the sections having the same type and length. The packing program 42 then performs a binary comparison operation on the sections having the same type and length to determine if the binary data within these sections is identical. If so, only one version of the identical section is stored in the universal image 44. For each unique section stored in the universal image 44, one or more indices are stored in the index table 46 correlating the respective microcode image permutation with the respective sections. The index table 46 tracks which sections of the universal image 44 are used to recreate a copy of the original microcode image. The index table 46, for example, may include string names or selection code for correlating the sections with the appropriate microcode images.

In some cases, it has been discovered that the largest section of a microcode image, e.g. the code section, typically includes identical code as other code sections of other microcode images. In this respect, the packing program 42 can create a universal image having a size that is greatly reduced compared to the accumulation of several microcode images having repetitive sections. In addition, when new versions of one or more images is generated, the packing program 42 can create a new version of the universal microcode image.

Figure 5:
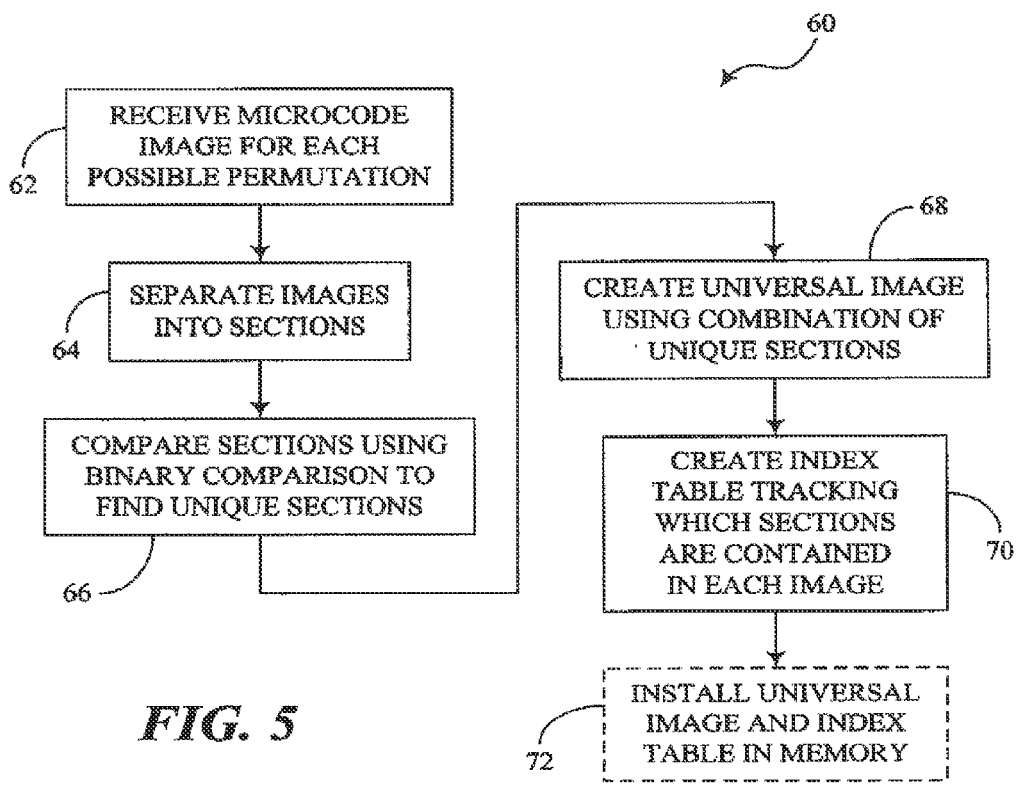
FIG. 5 is a flow chart illustrating an embodiment of a method for creating a universal image.

FIG. 5 is a flow chart illustrating an embodiment of a method 60 for packing microcode images into a universal image. The method 60, according to this implementation, includes receiving a plurality of microcode images representing different possible permutations of device configuration parameters, as indicated in block 62. In block 64, the method 60 includes separating the images into sections using section markers contained therein.

In block 66, the sections of each image are compared with each other to determine the sections having the same binary pattern. By determining the lengths of the sections, the sections can be compared with other sections having the same length. Also, the sections can be compared with other sections having the same type. When the sections having identical code are found, the method 60 further includes creating a universal image from the combination of unique sections, as indicated in block 68. Also, an index table is created, as indicated in block 70, for tracking which sections are found in each image permutation.

Block 72, which may involve a network interface or downloading mechanism, includes installing the universal image and index table into an end-user communication device. The files can be a pre-installed during manufacture of the end-user communication device, can be downloaded from a headend facility, or can be transferred to the end-user communication device in any other suitable manner. Other installation mechanisms are also contemplated.

Figure 6:
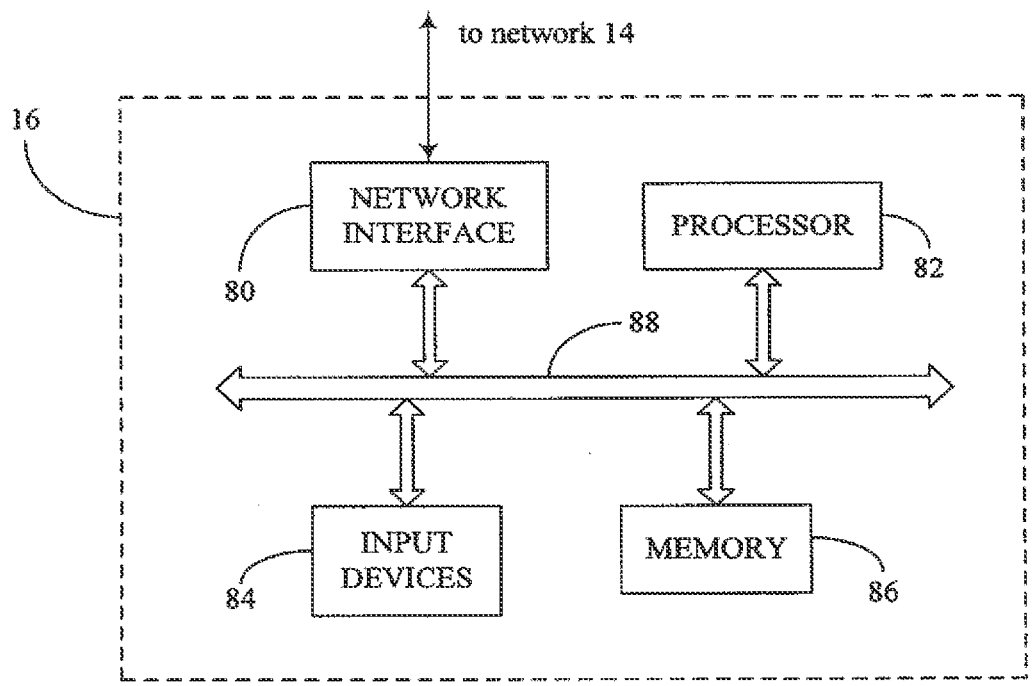
FIG. 6 is a block diagram of an embodiment of the end-user communication device shown in FIG. 1.

FIG. 6 is a block diagram of an embodiment of the end-user communication device 16 shown in FIG. 1. In this implementation, the end-user communication device 16 includes, among other things, a network interface 80, a processor 82, input devices 84, and memory 86, each interconnected by an interface bus 88. The network interface 80 includes any suitable combination of connectors, terminals, ports, etc. for communicating with the network 14 (FIG. 1). The network interface 80, for example, may be configured to communicate with the network 14 via a coaxial cable, twisted pair phone line, home network wiring, etc.

The input devices 84 include any suitable mechanisms for entering information into the end-user communication device 16. For example, the input devices 84 may include buttons (not shown) located on a housing of the end-user communication device 16 or a receiver for receiver remote commands, such as by a remote control device. In other embodiments, the end-user communication device 16 may include switches (not shown) located on the housing thereof.

Regarding the use of switches, an installer or user can configure the switches to enter or select input signals, such as configuration or set-up parameters, e.g. media type, frequency range, compatibility parameters, configuration parameters, QoS parameters, etc. The specific frequency band of the end-user communication device 16 is typically related to a hardware filter in the device and is not changeable. In this case, an identification value can be set in memory during production of the device to indicate the frequency band for that device such that entry of selections via the input devices 84 can be received and stored electronically. However, in the case of hardware devices, such as switches, the selections, based on the position of the switches, for example, can be entered at any time and then loaded upon demand.

The memory 86 may include any suitable combination of volatile and non-volatile memory devices. The non-volatile memory, for example, may include flash memory, EEPROM, etc. The volatile memory may include RAM, DRAM, etc. When the device configuration parameters are received via input devices 84, the memory 86 stores these parameters. The memory 86 also stores a configuration loading program, which may be associated with or incorporated in a boot loader or other similar program for loading boot up or configuration set-up instructions into memory for powering up, booting, or rebooting the end-user communication device 16. Using the device configuration parameters, the configuration loading program can reconstruct the original microcode image from the universal image according to the index table mapping scheme for that image. Once loaded, the processor 82 can load the microcode image into hardware to initialize the device before the device is booted up or powered up.

Figure 7:
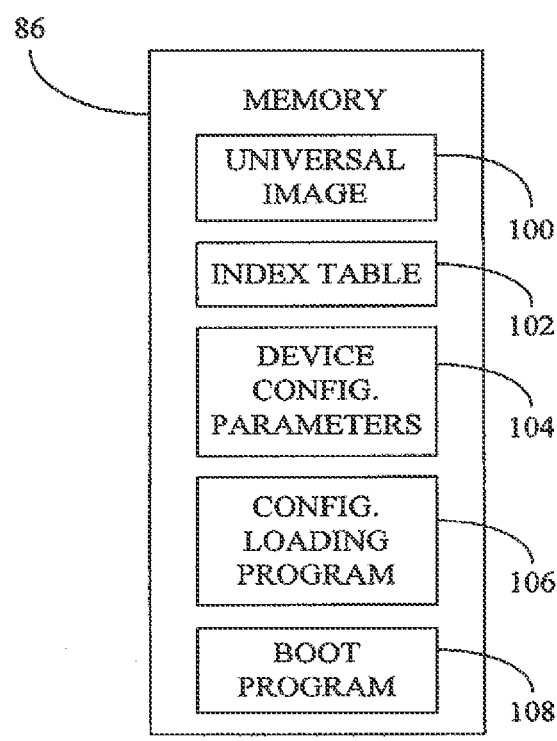
FIG. 7 is a block diagram of an embodiment of the memory shown in FIG. 6.

FIG. 7 is a block diagram of an embodiment of the memory 86 shown in FIG. 6. In this implementation, the memory 86 includes storage capacity for storing therein the universal image 100, index table 102, boot parameters 104, a configuration loading program 106, a boot program 108, etc. The universal image 100 and index table 102 are received from the headend 12, for example, by a broadcast message, unicast message, or by downloading the files from the headend 12. In some embodiments, the universal image 100 and index table 102 are downloaded during boot time, thereby reducing the amount of memory 86 dedicated to storing these files.

The device configuration parameters 104 represent the particular set-up configuration of the end-user communication device 16. As mentioned above, the device configuration parameters 104 can include a frequency range, type of media connection, compatibility parameters, customer preferences, network performance or service quality parameters, etc. These device configuration parameters 104 can be stored electronically in flash or can be retrieved from hardware switches.

Based on the device configuration parameters, the configuration loading program 106 correlates the particular permutation of the device configuration parameters with an entry in the index table 102. The index table 102 includes entries relating the particular permutation with the respective combination of unique sections of the universal image. The configuration loading program 106 pieces the sections together in the proper combination and order to reassemble or reconstruct the original microcode image for the end-user communication device 16 arranged with the particular configuration. The reconstructed microcode image is stored in RAM and the boot program 108 runs the boot up or power up procedure using the reconstructed image. If the device configuration parameter includes a combination that does not correspond to an entry in the index table 102, a default image can be loaded for the boot program 108.

It should be noted that the universal image 100 could be deployed to any end-user communication devices 16. Each individual end-user communication device 16 can then create the appropriate original image from the universal image in the residence. The conversion from the universal microcode image to the specific microcode image to be used by the end-user communication device 16 can therefore be deferred until boot time. If the device configuration parameters are changed in the device, the same universal image 100 can be used to reassemble a different image as needed.

Figure 8:
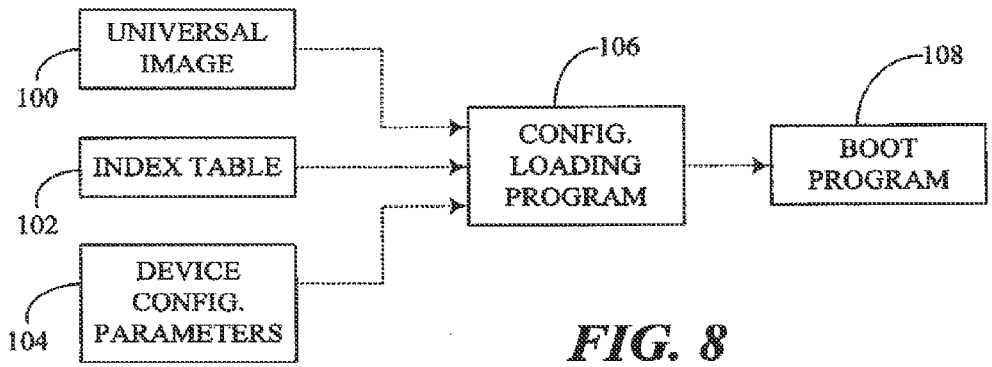
FIG. 8 is a schematic diagram illustrating an embodiment of a process for reconstructing a microcode image from a universal image.

FIG. 8 is a diagram illustrating an embodiment of an operation of the memory 86 of FIG. 7. In this example, the configuration loading program 106 in memory 86 receives information related to the universal image 100, index table 102, and device configuration parameters 104. The processor 82 (FIG. 6) runs the configuration loading program 106 upon reboot to reconstruct the original image for the particular end-user communication device 16 from the information in the universal image 100, index table 102, and device configuration parameters 104. The configuration loading program 106 loads the reconstructed image into RAM for proper rebooting by the boot program 108.

The packing program 42 and configuration loading program 106 of the present disclosure can be implemented in hardware, software, firmware, or a combination thereof. For instance, the packing program 42 and configuration loading program 106 can be implemented in software or firmware that is stored in a memory and executed by a suitable instruction execution system. If implemented in hardware, as in an alternative embodiment, the packing program 42 and configuration loading program 106 can be implemented with any combination of discrete logic circuitry, an application specific integrated circuit (ASIC), a programmable gate array (PGA), a field programmable gate array (FPGA), etc.

The packing program 42 and configuration loading program 106 comprise an ordered listing of executable instructions for implementing logical functions. These programs can be embodied in any computer-readable medium for use by an instruction execution system, apparatus, or device, such as a processor-based system. In the context of this document, a "computer-readable medium" can be any medium that can contain, store, communicate, propagate, or transport the programs for use by the instruction execution system, apparatus, or device.

Figure 9:
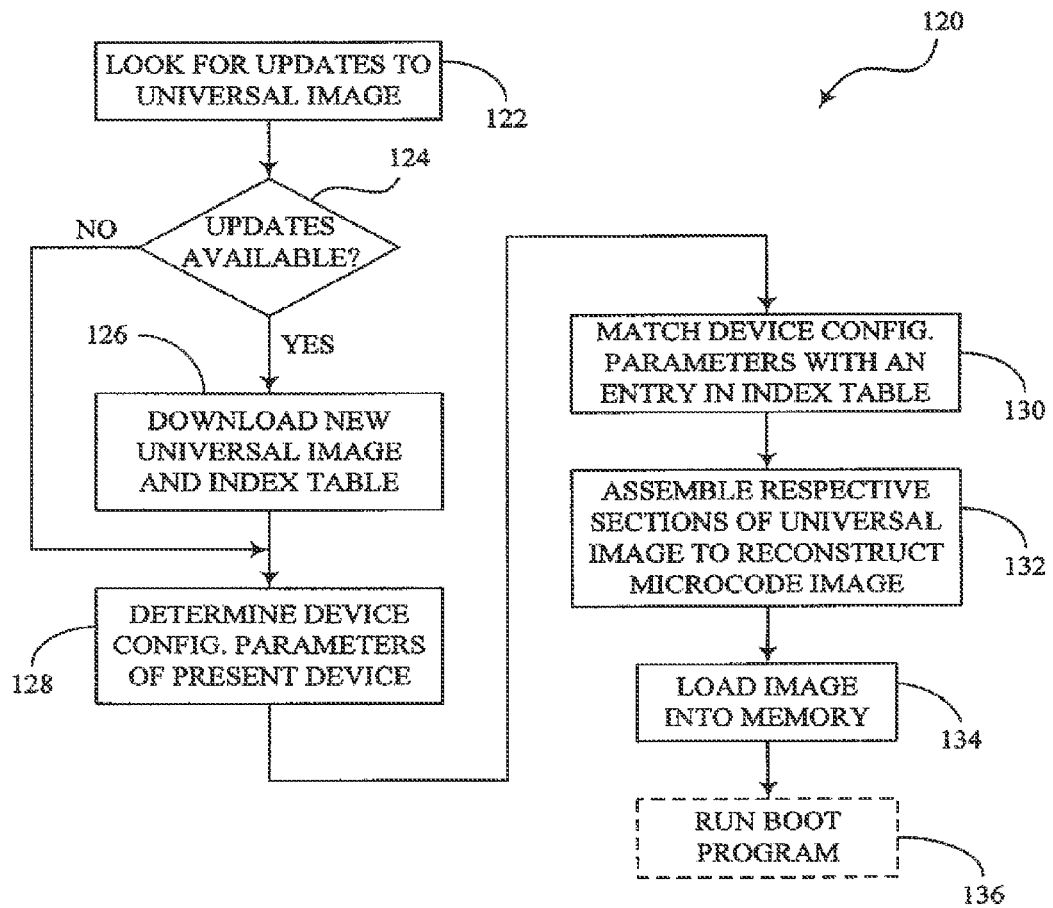
FIG. 9 is a flow chart illustrating an embodiment of a method for reconstructing a microcode image.

FIG. 9 is a flow chart illustrating an embodiment of a method 120 for loading configuration parameters into a device to be booted up. In this embodiment, method 120 includes searching a communication network for updates to a universal image, as indicated in block 122. Alternatively, if an end-user communication device is newly installed and does not yet contain a universal image, then block 122 can include looking for the latest version of the universal image on the network. In decision block 124, it is determined whether any updates are available. If so, a new universal image and corresponding index table are downloaded, as indicated in block 126, and the method 120 flows to block 128. If it is determine in block 124 that no updates are available, the method skips block 126 to block 128.

In block 128, the device configuration parameters of the present device are determined. The device configuration parameters may include, for example, the type of media interfacing between the device and the network, (e.g. twisted pair phone line or coaxial cable), frequency band of the device, and other configurations, such as QoS, etc. These device configuration parameters can be retrieved when needed, either from flash when stored electrically, or from hardware devices when set physically.

In block 130, the device configuration parameters that are determined in block 128 are used to match an entry in the index table. In block 132, the respective sections of the universal image corresponding to the entry in the index table are pieced together to reconstruct a microcode image. The sections are assembled to reconstruct the original microcode image file for the particular device and particular set-up configuration. In block 134, the reconstructed original microcode image is loaded into memory for initializing the end-user communication device. Once loaded, a boot program or initialization program using the original microcode image can be run to initialize or boot up the device.

The flow charts of FIG. 5 and FIG. 9 show the architecture, functionality, and operation of possible implementations of the packing program 42 and configuration loading program 106. In this regard, each block represents a module, segment, or portion of code, which comprises one or more executable instructions for implementing the specified logical functions. It should also be noted that in some alternative implementations, the functions noted in the blocks may occur out of the order noted in FIGS. 5 and 9 or in a reverse order, or may be executed substantially concurrently, depending upon the functionality involved.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. An end-user communication device comprising:
   memory configured to store a universal microcode image, an index table, a packing program, and a configuration loading program, wherein the packing program comprises logic configured to identify unique sections and identical sections in sections of a plurality of microcode images, wherein identifying identical sections comprises searching through the sections of the plurality of microcode images to identify sections having same type and length, and performing a binary comparison of the sections of each of the plurality of microcode images having the same length and the same type to identify identical sections; and
   a processor configured to execute the configuration loading program, wherein when executed the configuration loading program is configured to create a microcode for booting the end-user communication device from the stored universal microcode image based on configuration parameters of the end-user communication device, wherein the configuration loading program being configured to create the microcode for booting comprises the configuration loading program configured to:
      determine the configuration parameters of associated with the end-user communication device,
      match the determined configuration parameters with an entry in an index table, wherein the index table comprises information that associates each of a number of possible permutations of the device configuration parameters with a combination of executable code sections and configuration information sections of the universal microcode image, the device configuration parameters being selected from a group of parameters comprising: media type parameter; frequency band parameter; and quality of service parameter, wherein the media type parameter is selected from a group of types of media to which the end-user communication device is to be connected wherein the index table includes a list of unique sections contained in the universal microcode image,
      identify sections from the universal code matching the configuration parameters, wherein the index table further includes string names correlating the sections in the list with the device configuration parameters, and
      assemble the identified sections in an order based on the index table to create the microcode; and
   wherein the processor is further configured to load the combination of executable code sections and configuration information sections into a boot program for booting up the end-user communication device.

2. The end-user communication device of claim 1, wherein the frequency band parameter is selected from a group of three or more frequency bands and the quality of service parameter is selected from a group of three or more configurations.

3. The end-user communication device of claim 1, wherein the end-user communication device is associated with a set-top box.

4. The end-user communication device of claim 3, wherein the set-top box is an Internet protocol (IP) set-top box using a home networking interface chip.

5. The end-user communication device of claim 1, wherein, when the device configuration parameters of the end-user communication device are changed, the index table associates another permutation of the device configuration parameters with another combination of executable code sections and configuration information sections of the universal microcode image, and the processor loads the other combination of executable code sections and configuration information sections into the boot program for rebooting the end-user communication device with the changed device configuration parameters.

6. The end-user communication device of claim 1, wherein the configuration loading program is further configured to defer creating the microcode until booting of the end-user communication device.

7. The end-user communication device of claim 1, wherein the configuration loading program is further configured to recreate the microcode upon change in the configuration parameters of the end-user communication device.

8. The end-user communication device of claim 1, wherein the configuration loading program is further configured search for the latest version of the universal microcode image.

9. The end-user communication device of claim 8, wherein the configuration loading program is configured to look for the latest version of the universal microcode image based on one of the following:
   the end-user communication device is a new device; and
   the end-user communication device does not have the universal microcode image stored thereon.

10. The end-user communication device of claim 1, wherein each sections of the microcode comprises one or more executable instructions for implementing a specified logical function.

11. A method comprising the steps of:
   receiving a universal microcode image created from sections of a plurality of microcode images, the universal microcode image being created by identifying unique sections and identifying identical sections in sections of the plurality of microcode images, wherein identifying identical sections comprises;
      searching through the sections of the plurality of microcode images to identify sections having same type and length, and
      performing a binary comparison of the sections of each of the plurality of microcode images having the same length and the same type to identify identical sections;
   determining configuration parameters of an electronic device, wherein the configuration parameters comprise at least two of the following: media type parameter; frequency band parameter; and quality of service parameter, wherein the media type parameter is selected from a group of types of media to which the electronic device is to be connected; and
   reconstructing a microcode for booting the electronic device from the received universal microcode image based on the determined configuration parameter, wherein creating the microcode comprises:
      matching the configuration parameters with an entry in an index table, the entry associated with a combination of sections of the universal microcode image wherein the index table includes a first list of unique sections contained in the universal microcode image, wherein the index table further includes string names correlating the sections in the first list with the configuration parameters,
      identifying sections from the universal code matching the configuration parameters, and
      assembling the identified sections of the universal image to reconstruct the microcode image having executable code and configuration information designed to initialize the electronic device.

12. The method of claim 11, further comprising the step of: retrieving the configuration parameters of the electronic device from a memory device.

13. The method of claim 11, further comprising the step of: loading the reconstructed microcode image into a boot program.

14. The method of claim 13, further comprising the step of: running the boot program to boot up the electronic device using the reconstructed microcode image.

15. The method of claim 14, further comprising loading a default microcode when the booting using the reconstructed microcode image fails.

16. An apparatus comprising:
   a memory storage; and
   a processing unit coupled to the memory storage, wherein the processing unit is operative to:
      create a universal microcode image created from sections of a plurality of microcode images wherein the processing unit being operative to create the universal microcode image comprises the processing unit being operative to identify unique sections and identify identical sections in sections of the plurality of microcode images, wherein the processing unit being operative to identify identical sections comprises the processing unit being operative to,
      search through the sections of the plurality of microcode images to identify sections having same type and length, and
      perform a binary comparison of the sections of each of the plurality of microcode images having the same length and the same type to identify identical sections,
      determine configuration parameters of an electronic device, wherein the configuration parameters comprise at least one of the following: media type parameter; frequency band parameter; and quality of service parameter, wherein the media type parameter is selected from a group of types of media to which the electronic device is to be connected,
      create a microcode for booting the electronic device based on the determined configuration parameter, wherein the processing unit being operative to create the microcode comprises the processing unit being operative to:
         match the determined configuration parameters with an entry in an index table, the entry associated with a combination of sections of the universal microcode image, wherein the index table includes a first list of unique sections contained in the universal microcode image, wherein the index table further includes string names correlating the sections in the first list with the configuration parameters,
         identify sections from the universal code matching the configuration parameters, and
         assemble the identified sections of the universal image to reconstruct the microcode image having executable code and configuration information designed to initialize the electronic device.

17. The apparatus of claim 16, wherein the processing unit is further operative to retrieve the configuration parameters of the electronic device from a memory device.

18. The apparatus of claim 16, wherein the processing unit is further operative to load the reconstructed microcode image into a boot program.

19. The apparatus of claim 18, wherein the processing unit is further operative to run the boot program to boot up the electronic device using the reconstructed microcode image.

* * * * *